(12) United States Patent
Shinohara et al.

(10) Patent No.: US 7,464,628 B2
(45) Date of Patent: Dec. 16, 2008

(54) AUTOMATIC LATHE

(75) Inventors: Hiroshi Shinohara, Nishitokyo (JP); Toru Takahashi, Nagano (JP); Yoshiaki Hirakawa, Nagano (JP); Yosuke Ando, Nishitokyo (JP); Hajime Matsumaru, Nagano (JP)

(73) Assignee: Citizen Holdings Co., Ltd., Tokyo (JP)

( * ) Notice: Subject to any disclaimer, the term of this patent is extended or adjusted under 35 U.S.C. 154(b) by 375 days.

(21) Appl. No.: 10/583,727

(22) PCT Filed: Dec. 26, 2003

(86) PCT No.: PCT/JP03/16928
§ 371 (c)(1),
(2), (4) Date: Aug. 8, 2006

(87) PCT Pub. No.: WO2005/065870
PCT Pub. Date: Jul. 21, 2005

(65) Prior Publication Data
US 2007/0224007 A1    Sep. 27, 2007

(51) Int. Cl.
*B23B 3/00*  (2006.01)
*B23B 19/02* (2006.01)

(52) U.S. Cl. .............. 82/117; 82/142; 82/152; 82/165

(58) Field of Classification Search .......... 82/117, 82/118, 142, 152, 165; 29/27 R, 27 C, 36
See application file for complete search history.

(56) References Cited

U.S. PATENT DOCUMENTS 2,273,369 A * 2/1942 Nielson ............. 82/164
4,180,894 A * 1/1980 Link ............... 29/36
4,831,906 A * 5/1989 Sugimoto et al. ...... 82/118
4,998,455 A * 3/1991 Jauch ............... 82/127
5,924,344 A * 7/1999 Link et al. .......... 82/129
6,665,579 B2 * 12/2003 Sasaki et al. ......... 700/159

FOREIGN PATENT DOCUMENTS

| EP | 1 203 634 A1 | 5/2002 |
| JP | 04-115804 | 4/1992 |
| JP | 09-225703 | 9/1997 |
| JP | 2750356 | 2/1998 |
| JP | 11-010405 | 1/1999 |

* cited by examiner

Primary Examiner—Willmon Fridie
(74) Attorney, Agent, or Firm—Manabu Kanesaka

(57) ABSTRACT

An automatic lathe is provided which is capable of rapidly and easily switching between machining of a material with a guide bush and machining of the material without the guide bush. The automatic lathe has a head stock (6) and a guide bush support table (1). The head stock (6) is provided with a spindle drive motor (8). The guide bush support table (1) is provided with a guide bush rotating motor (11). There are provided: support table fixing means (15) for positioning and fixing the guide bush support table (1); a guide member (12) rotatably installed on the guide bush support table (1) and regulated so as not to move forward and backward and having a through-hole formed for a spindle (3) to be inserted therein; a guide bush (4) detachably fitted to the tip of the guide member (12); and spindle fixing means (37) for positioning and fixing the spindle (3) on the guide bush support table (1) at a specified position when the guide bush (4) is removed from the guide member (12).

12 Claims, 10 Drawing Sheets

AUTOMATIC LATHE

TECHNICAL FIELD

The present invention relates to an automatic lathe having a spindle and a tool post capable of relative movement, and the automatic lathe machines a material gripped by a chuck at the tip of the spindle by use of a tool installed on the tool post.

BACKGROUND ART

In some known machine tools such as a numerically controlled (NC) automatic lathe capable of implementing various kinds of automatic lathe machining (hereinafter generically called an automatic lathe), a guide bush is provided in the vicinity of a position where machining is performed with a tool, and the tip of a long rod-like material (hereinafter referred to as a rod material) gripped by a chuck at the tip of a spindle (the chuck provided in the spindle may be written as "spindle chuck") is supported by the guide bush and thus machined (e.g., Japanese Patent Publication Laid-open No. 4-115804).

In the machining of the rod material using the guide bush, a part to be machined at the tip of the rod material is supported so as not to cause deflection during lathe machining, such that there is an advantage that even an elongated product can be continuously and highly accurately machined from the long rod material.

However, in spite of the advantage described above, the automatic lathe equipped with the guide bush has a problem that there is a gap, which is small, between the guide bush and the rod material, and the rod material moves due to this gap, which makes the automatic lathe unsuitable to machine products requiring more accurate machining.

Furthermore, there is a problem that, due to a condition that the dimension of the rod material be longer than at least a distance between a grip position of the chuck at the forward end of the spindle and a machining position in the vicinity of the guide bush, it is not possible to machine a rod material shorter than this distance. Moreover, there is a problem that if a long rod material is machined, a material between the grip position and the machining position results in a remaining material.

Thus, the automatic lathe equipped with the guide bush has a problem of increased equipment cost and machining cost because its use is limited to the machining of the rod materials having a length equal to or longer than a certain length.

On the other hand, another automatic lathe has been proposed, wherein when highly accurate machining is carried out for a relatively short product or when machining is carried out under a machining condition with a heavy cutting load, a guide bush is suitably removed, thereby making it possible to switch from machining with the guide bush to machining without the guide bush (e.g., Japanese Patent Publication Laid-open No. 9-225703).

However, in the technique described in this document, it is necessary to insert the tip of a spindle into a protection hole placed instead of the guide bush when machining is carried out without the guide bush. Thus, a certain length of the tip of the spindle protrudes from a tool post, but the part protruding from the tool post is not supported. Therefore, the tip of the spindle is in an overhanging state, and its rigidity is reduced. This leads to a problem that the tip of the spindle bends to result in a decreased machining accuracy when machining a relatively short product requiring high machining accuracy which needs to be machined without using the guide bush and when machining is carried out with a heavy cutting load.

Furthermore, a lathe of a type in which a tool post is movable has been proposed, wherein in order to increase an accuracy when machining is carried out with a heavy cutting load, a guide bush having a chuck function is held at the tip of a spindle held on the tool post, and a material feed shaft comprising a chuck is provided within the spindle movably with respect to the spindle (e.g., refer to Patent No. 2750356).

However, even the technique described in this document can not solve the above-mentioned problem of producing a remaining material. Moreover, there are needed a mechanism to open/close the chuck of the guide bush, and a mechanism to open/close the spindle chuck, so that the configuration of the automatic lathe is complicated and the length of the spindle is increased, leading to another problem that the overall length of a machine is increased.

The present invention has been made in view of the foregoing problems, and is directed to provide an automatic lathe comprising a guide bush which rotates at the same speed as a material. The automatic lathe is capable of easily switching between the machining of the material with the guide bush and the machining of the material without the guide bush. The automatic lathe has a simple and compact configuration in which a spindle is rigidly supported up to its tip or up to the vicinity of the tip to increase mechanical rigidity, such that machining accuracy is not decreased even when the material is machined without using the guide bush. Moreover, the switching operation can be easily performed by a user who is not a person in charge of, for example, a manufacturer of the automatic lathe.

DISCLOSURE OF THE INVENTION

In order to achieve the object of the present invention, an automatic lathe of the present invention has a tool post and a spindle configured to relatively move in a spindle axis line direction, and machines a material gripped by a spindle chuck at the tip of the spindle by use of a tool installed on the tool post, and the automatic lathe comprises: a head stock configured to move forward and backward; the spindle rotatably supported on the head stock and having a through-hole formed for the rod-like material to be inserted therethrough; spindle driving means which is provided in the head stock to rotate the spindle; the tool post equipped with a tool to machine the material gripped by the spindle chuck; a guide bush support table disposed closer to a tip side of the spindle than the head stock; support table fixing means for positioning and fixing the guide bush support table at a specified position of a bed; a guide member which is rotatably supported on the guide bush support table and which is regulated so as not to move forward and backward with respect to the guide bush support table and in which a through-hole is formed to insert the spindle therein; a guide bush detachably fitted to the tip of the guide member; guide bush driving means which is provided in the guide bush support table to rotate the guide member together with the guide bush; spindle moving means for moving the spindle forward and backward together with the head stock inside the guide member; spindle fixing means for preventing the spindle from moving forward and backward with respect to the guide bush support table, and positioning and fixing the spindle at a specified position on the guide bush support table when the guide bush is removed from the guide member; and control means for performing synchronous control of the spindle driving means and the guide bush driving means when machining the material by use of at least the guide bush.

According to this configuration, when machining is carried out using the guide bush, the material is gripped by the spindle chuck, and the tip of the material is supported by the guide bush. In this state, predetermined machining is carried out with the tool installed on the tool post while the material is being moved together with the spindle by the spindle moving means. At this point, while the guide bush is rotated by the guide bush driving means and the spindle is rotated by the spindle driving means, the guide bush and spindle are rotated at a synchronized speed by the control means for synchronously driving both the driving means. Therefore, scraping and burning are not caused due to a speed difference produced between the guide bush and the material, thereby allowing machining with high-speed rotation.

When the material is machined without using the guide bush, the guide bush is removed from the tip of the guide member, and the spindle is moved inside the guide member and positioned at the specified position. Then, the spindle is fixed to the guide member by the spindle fixing means, thereby regulating forward and backward movement inside the guide member and fixing the spindle in a state positioned at the specified position. Thus, the spindle can be supported up to its tip by the guide member, thus allowing increased mechanical rigidity of the tip of the spindle and highly accurate machining.

Here, being "capable of relative movement in the spindle axis line direction" includes the following cases: a case where the material is machined while the tool installed on the tool post is being moved in a direction to cut the material gripped by the spindle and in the spindle axis line direction; or a case where the tool installed on the tool post is moved only in the cutting direction, and the material is machined while being moved in the spindle axis line direction together with the spindle.

In this case, a guide may be provided to guide the forward and backward movement of the guide bush support table so that the guide bush support table is movable along the guide when the fixing of the guide bush support table by the support table fixing means is cancelled.

According to this configuration, if the guide bush is removed from the guide member to bring the spindle and the guide bush support table into a fixed state, and the fixing of the guide bush support table by the support table fixing means is cancelled, the guide bush support table can be moved together with the spindle. That is, machining can be performed in such a manner that the guide bush support table functions as a moving head stock of the automatic lathe.

The support table fixing means for fixing the guide bush support table on the bed can comprise a positioning member positioned and fixed on the bed, and a bolt coupling the positioning member to the guide bush support table.

Furthermore, a spacer with a specified width may be placed between the positioning member and the guide bush support table so that the position of the guide bush or the tip of the spindle is adjustable when the guide bush is fitted or removed.

The positioning member may be a tool post base which supports the tool post.

Furthermore, in the present invention, rotation transmission means for transmitting the rotation of the guide member to the spindle when the guide bush is removed may be provided between the guide member and the spindle, so that the rotation of the guide member is transmitted to the spindle.

According to this configuration, the driving force of the guide bush driving means for rotating the guide member can be used as driving means for rotating the spindle, and the guide bush driving means for rotating the guide bush and the spindle driving means for rotating the spindle can be suitably used to achieve energy conservation and improve turning effort.

The control means can control the driving of both the spindle driving means and the guide bush driving means in accordance with a cutting condition when the material is machined without using the guide bush. For example, in the case of heavy cut with a heavy cutting load, both the guide bush driving means and the spindle driving means are driven/controlled at the maximum output to perform machining. In the case of light cut with a light cutting load, both the guide bush driving means and the spindle driving means can contribute to the driving force necessary to rotate the spindle to perform machining. Thus, the heat quantity of the driving means can be dispersed to two places including the guide bush driving means and the spindle driving means, and the heating of the head stock and the guide bush support table can be suppressed.

Furthermore, when the guide bush is removed, the spindle chuck and a cam member which opens/closes the spindle chuck are removed from the spindle and located inside the tip of the guide member, and a chuck positioning member is fitted to the tip of the guide member to position the spindle chuck when the spindle chuck grips the material. This allows a configuration wherein a mechanism similar to a chuck mechanism of the spindle which grips the material during machining is incorporated in the tip of the guide member.

According to this configuration, after the guide bush has been removed, the guide member functions as the spindle, and a chuck mechanism is configured by the spindle chuck incorporated in the guide member and the cam member, so that a high rigidity of the tip of the spindle which grips the material can be maintained even if the guide bush is removed.

Furthermore, when the guide bush is removed from the guide member, the head stock may be coupled to the guide bush support table by coupling means.

This makes it possible to reduce the burden on the spindle when the material is machined without using the guide bush.

When the spindle driving means and the guide bush driving means are built-in type motors, the spindle easily causes thermal expansion in the axis line direction because rotors of the motors are brought to a high temperature. Therefore, when the head stock is coupled to the guide bush support table by the above-mentioned coupling means, a thermal expansion absorption member which absorbs a dimensional change of the spindle due to the thermal expansion can be provided in at least one place of the spindle, for example, between the head stock and the guide bush support table, in order to prevent the deformation of the spindle due to the thermal expansion.

The thermal expansion absorption member comprises regulating means for regulating the spindle so that the spindle does not to move forward and backward with respect to the head stock when the guide bush is fitted, and regulation canceling means for canceling the regulation of the spindle by the regulating means when the guide bush is removed.

According to this configuration, when the guide bush is removed and the head stock is coupled to the guide bush support table by the coupling means, the regulation preventing the spindle from the forward and backward movement is cancelled, thereby allowing the spindle to move with respect to the head stock.

In addition, after the guide bush has been removed, the spindle is fixed by the spindle fixing means so as not to move forward and backward with respect to the guide bush support table, and the guide bush support table is directly coupled to the head stock via the coupling means, so that the spindle usually does not freely move forward and backward with respect to the head stock. If the spindle causes the thermal expansion, the spindle moves with respect to the head stock so as to absorb the dimensional change due to the thermal expansion.

Furthermore, the regulating means comprises an engaging member which engages with the spindle in the front and rear on the spindle axis line, and a fitting member which fits the engaging member to the head stock so that the engaging member does not rotate with respect to the head stock and so that the engaging member has a gap of preset dimensions in the spindle axis line direction without separating from the head stock when the regulation of the spindle is cancelled by the regulation canceling means. The regulation canceling means can be a fitting member which fits and fixes the engaging member onto the head stock.

According to this configuration, if the fitting member is simply removed from the engaging member, the forward and backward movement of the engaging member and the spindle is enabled.

The configuration of the present invention is as described above, so that the guide bush is easily fitted/removed, and one automatic lathe can be switched to rapidly adapt to the machining with the guide bush and the machining without the guide bush, thereby allowing reductions in equipment cost and machining cost. Further, when the guide bush is used, even an elongated product can be continuously machined with relatively high accuracy. When the guide bush is not used, the spindle is positioned and fixed at the specified position on the guide bush support table, or a spindle chuck mechanism which grips the material during the machining is incorporated in the tip of the guide member so that the guide member functions as a new spindle, thereby allowing a rigid spindle configuration. Therefore, a relatively short product can be highly accurately machined, and the machining can be carried out with a heavy cutting load.

Furthermore, when the material is machined without using the guide bush, the guide bush driving means and the spindle driving means are suitably used, thereby allowing energy conservation and an improvement in turning effort, and allowing the suppression of a decrease in machining accuracy due to the heat of the driving means.

BRIEF DESCRIPTION OF THE DRAWINGS

FIG. 1 concerns one embodiment of an automatic lathe of the present invention, wherein

BEST MODE FOR CARRYING OUT THE INVENTION

One preferred embodiment of the present invention will hereinafter be described in detail with reference to the drawings.

Figure 1A:
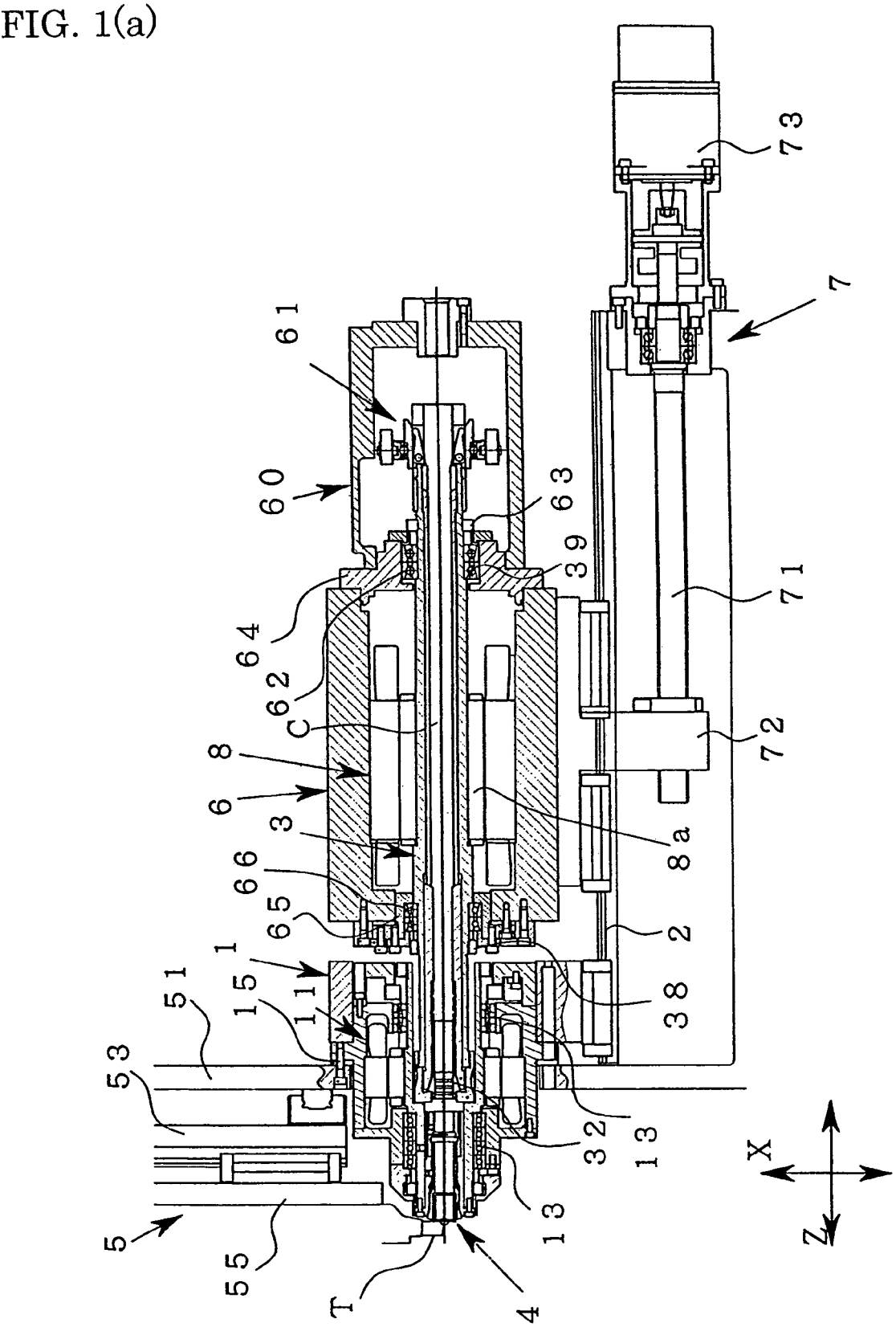
FIG. 1(a) is a sectional view explaining the configuration of essential parts including a guide bush support table and a head stock.
Figure 1B:
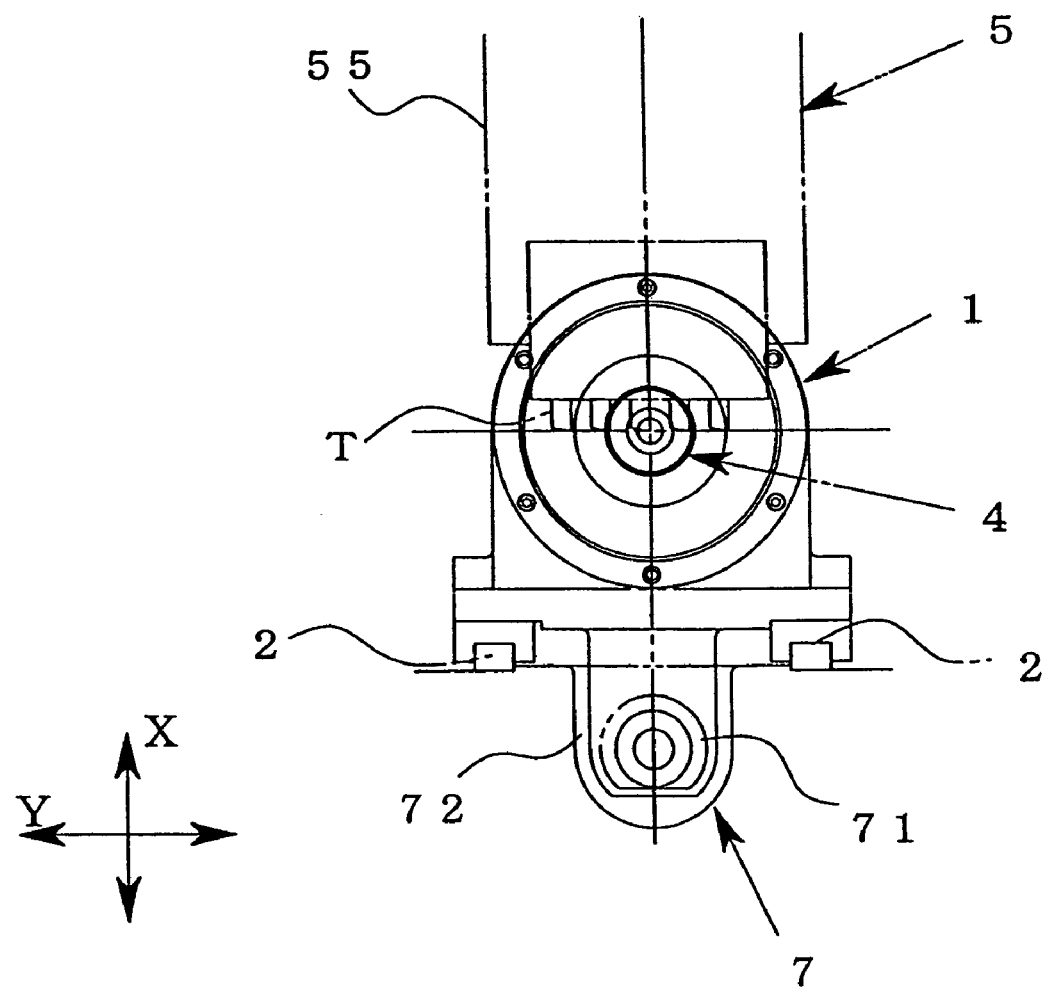
FIG. 1(b) is a front view of the head stock in FIG. 1(a)

FIG. 1 concerns one embodiment of an automatic lathe of the present invention, wherein FIG. 1(a) is a sectional view explaining the configuration of essential parts including a guide bush support table and a head stock, and FIG. 1(b) is a front view of the guide bush support table in FIG. 1(a).

It is to be noted that in the following description, "front", when referred to, indicates a front end side of a spindle provided with a spindle chuck which grips a rod material, that is, the left side in FIG. 1(a), while "rear", when referred to, indicates a rear end side of the spindle, that is, the right side in FIG. 1(a).

As shown in FIG. 1(a), the automatic lathe in this embodiment has: a slide guide 2 provided on an unshown bed; a head stock 6 which freely moves in forward and backward directions on the slide guide 2; a guide bush support table 1 disposed in front of the head stock 6 and capable of moving in the forward and backward directions on the slide guide 2; a spindle 3 rotatably supported on the head stock 6 and provided so as to freely move in forward and backward directions with respect to the guide bush support table 1; a guide bush 4 rotatably provided on the guide bush support table 1 in front of the spindle 3 and on the same axis line C as the spindle 3; a tool post 5 equipped with a plurality of tools T to machine the rod material protruding from the guide bush 4; a collet open/close member 61 which is provided in the rear of the head stock 6 and which opens/closes a collet chuck 32 that is a spindle chuck fitted to the front end of the spindle 3; and a spindle moving member 7 which moves the spindle 3 together with the head stock 6 in the forward and backward directions.

As shown in FIG. 1(b), the slide guides 2 are arranged in parallel on both sides under the guide bush support table 1 and the head stock 6, and the head stock 6 and the guide bush support table 1 can smoothly move forward and backward by the spindle moving member 7 provided under the slide guides 2, under the guidance of the slide guides 2.

Figure 2:
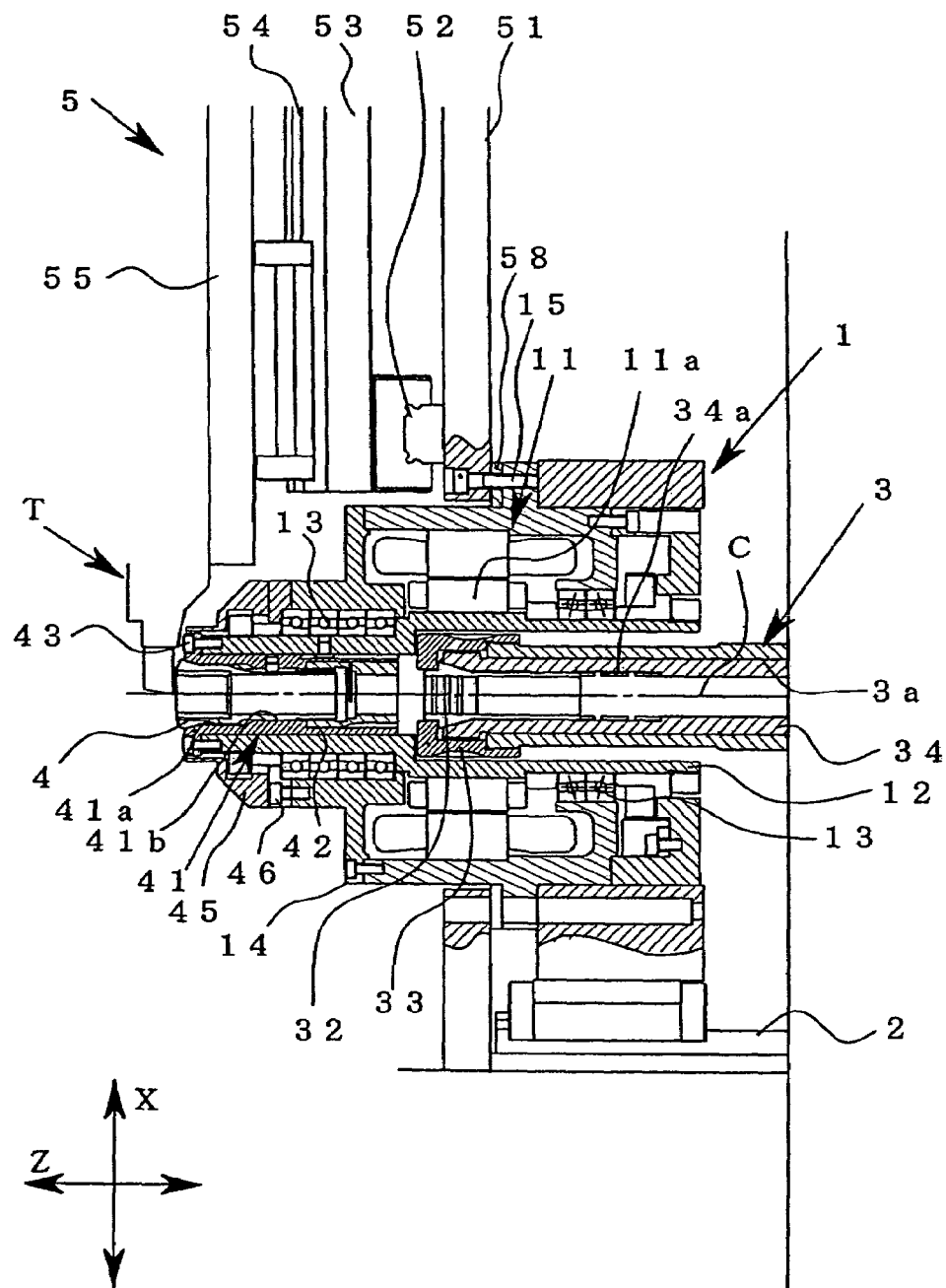
FIG. 2 is a view in which a part corresponding to the guide bush support table in FIG. 1 is enlarged.

FIG. 2 is a view in which the guide bush support table in FIG. 1(a) is enlarged.

A motor 11 which is guide bush driving means is incorporated in the guide bush support table 1, and a guide sleeve 12 which rotates on the axis line C is fitted to a rotor 11a of the motor 11. The guide sleeve 12 is rotatably supported by bearings 13, 13 on front end and rear end sides of the guide bush support table 1. The bearing 13 supporting the front end side of the guide sleeve 12 is held by a bearing holder 14 fitted to the front end of the guide bush support table 1. Therefore, the front end of the guide sleeve 12 is supported by the bearing 13 and the bearing holder 14.

The guide bush 4 is fitted to the front end of the guide sleeve 12 via a cylindrical attachment 41 which is guide bush fitting means. This attachment 41 has a large diameter hole 41a which receives a main body part of the guide bush 4, and a small diameter hole 41b which is formed in the rear of the large diameter hole 41a and into which a screw portion formed in the body of the guide bush 4 screws.

The main body part of the guide bush 4 is inserted into the large diameter hole 41a of the attachment 41, and the screw portion formed in the body thereof is inserted through the small diameter hole 41b to protrude therefrom, and then a nut 42 is screwed in and fastened to the screw portion, thus fitting the guide bush 4 to the attachment 41. Then, after inserted from the front end side of the guide sleeve 12, the attachment 41 fitted with the guide bush 4 is detachably fitted to the front end of the guide sleeve 12 by a plurality of bolts 43. Further, a cylindrical cover 45 is fitted to the outside of the attachment 41 to prevent foreign matter such as cutting chips from entering the guide bush support table 1 from a gap between the guide sleeve 12 and the attachment 41. The cover 45 is fitted to a front end surface of the bearing holder 14 by a plurality of bolts 46.

The tool post 5 has a tool post base 51 fixed to the unshown bed, a saddle 53 which freely moves forward and backward in a Y direction (direction rectangular to the surface of the drawing) with respect to the tool post base 51 under the guidance of a guide 52 of the tool post base 51, and a tool fitting member 55 which freely moves forward and backward in an X direction (vertical direction in the drawing) with respect to the saddle 53 under the guidance of a guide 54 provided in the saddle 53. The plurality of tools T is arranged in a comb-teeth manner and fitted to the tool fitting member 55. Then, the tool fitting member 55 is moved in the Y direction to determine the predetermined tool T to be used for machining from the plurality of tools T, and the cutting edge of the tool T is located in the vicinity of the guide bush 4 to machine the rod material.

It is to be noted that the guide bush support table 1 is fitted to the tool post base 51 by a plurality of bolts 15, and when the rod material is machined using the guide bush 4, the guide bush support table 1 is in a fixed state so as not to move on the slide guide 2.

Furthermore, as in this embodiment, when the guide bush support table 1 is fitted to the tool post base 51 to regulate its movement, the bolts 15 to be used are preferably formed of a material having low heat transmitting properties such as ceramic so that the heat is not transmitted from the guide bush support table 1 to the tool post base 51. Moreover, a spacer 58 formed of a material having low heat transmitting properties is preferably placed at a contact portion between the guide bush support table 1 and the tool post base 51.

In the spindle 3, a through-hole 3a is formed on the axis line C, and the collet chuck 32 which grips the rod material is fitted to the front end of the through-hole 3a. The collet chuck 32 is inserted into the front end of a cylindrical collet sleeve 34, and inserted into the front end of the spindle 3 together with the collet sleeve 34.

Further, a cap nut 33 which receives the front ends of the collet chuck 32 and the collet sleeve 34 is screwed in and fastened to a screw portion 3b formed on an outer peripheral surface of the front end of the spindle 3, thereby regulating the collet sleeve 34 and the collet chuck 32 so that they may not escape from the spindle 3.

A cam to open/close the collet chuck 32 is formed on an inner peripheral surface at the front end of the collet sleeve 34. Further, the collet sleeve 34 is capable of slight amount of forward and backward movement inside the cap nut 33 fitted to the spindle 3, and the collet sleeve 34 moves forward and backward with respect to the collet chuck 34 such that the collet chuck 32 is opened/closed by the cam.

The forward and backward movement of the collet sleeve 34 is performed by a draw bar 35 (see FIG. 1) provided in the rear of the collet sleeve 34. Inside the draw bar 35, a through-hole through which the rod material can be inserted is formed on the axis line C. The front end of the draw bar 35 butts against the rear end of the collet sleeve 34, and if the draw bar 35 moves forward to push the collet sleeve 34 forward, the cam of the collet sleeve 34 closes the collet chuck 32. Moreover, a return spring 34a is provided inside the collet sleeve 34, and always urges the collet chuck 32 in a direction to press it against the cap nut 33, that is, in a forward direction. Then, when the draw bar 35 moves backward, the collet sleeve 34 is pressed back with respect to the collet chuck 32 by the return spring 34a, thereby opening the collet chuck 32. The forward and backward movement of the draw bar 35 is performed by the known collet open/close member 61 provided in a housing 60 on the rear end side of the spindle 3.

As shown in FIG. 1, a bearing 62 is fitted to the front end of the housing 60 by a bearing holder 64. The rear end of the spindle 3 is rotatably supported by this bearing 62. Moreover, a step portion 39 is formed on the outer peripheral surface of the spindle 3 forward of the bearing 62, and this step portion 39 and a nut 63 which is screwed in from the rear end of the spindle 3 hold the bearing 62 from its front and rear.

Furthermore, a motor 8 as spindle driving means for rotating the spindle 3 is incorporated in the head stock 6. The driving of this motor 8 is controlled together with a motor 73 and the motor 11 by a control device of the automatic lathe.

Figure 3:
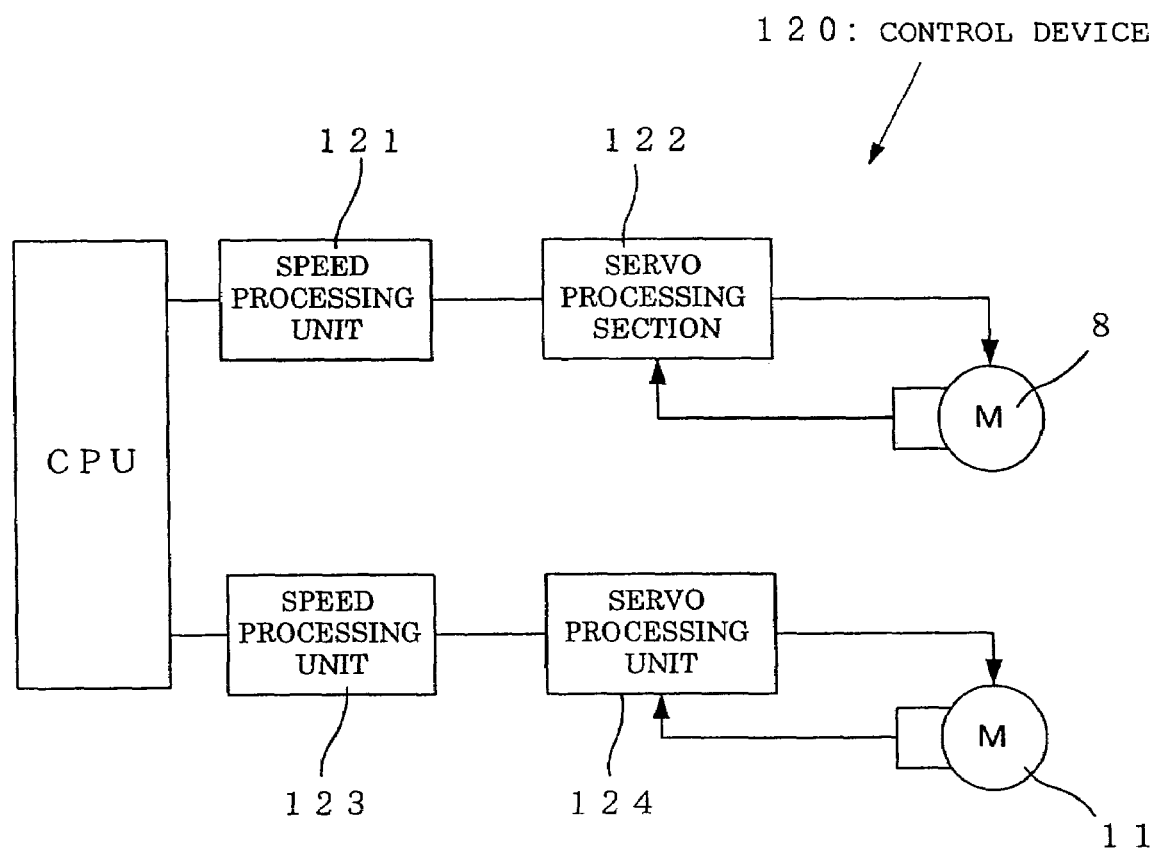
FIG. 3 is a block diagram of a control device which controls the driving of a motor to drive a spindle and the driving of a motor to drive a guide bush.

FIG. 3 is a block diagram of the control device which controls the driving of the motor 8 and the motor 11.

As shown in FIG. 3, a control device 120 comprises a first control system having a speed processing unit 121 which outputs a speed signal based on a command from the control device (CPU) of the automatic lathe, and a servo processing unit 122 which drives the motor 8 on the basis of an output signal from the speed processing unit 121; and a second control system having a speed processing unit 123 which outputs a speed signal based on a command from the control device (CPU), and a servo processing unit 124 which drives the motor 11 on the basis of an output signal from the speed processing unit 123. In an example shown in FIG. 3, there are provided the speed processing units 121 and 123 corresponding to the motors 8 and 11, respectively, but one speed processing unit common to the motors 8 and 11 may be provided.

In the control device 120 described above, when commands to drive the motor 8 and the motor 11 are output, the CPU transmits command signals to the speed processing unit 121 and the speed processing unit 123 to synchronize the driving of the motor 8 and the motor 11.

Thus, the load on the spindle 3 is dispersed to the two motors 8 and 11, such that the heat quantities of the motors 8 and 11 can be suppressed, and temperature increases in the head stock 6 and the guide bush support table 1 can be minimized. Moreover, because the two motors 8 and 11 disposed on the front end and rear end sides of the spindle 3 rotate the spindle 3 while equally dispersing the load, a torsion of the spindle 3 on the front end and rear end sides thereof can be suppressed.

Furthermore, both the motors 8 and 11 can be driven at the maximum output so as to adapt to heavy cutting.

The spindle 3 is fitted to a rotor 8a of the motor 8. As shown in FIG. 1, a bearing holder 65 is fitted to the front end of the head stock 6, and the spindle 3 is supported by a bearing 66 which is held by the bearing holder 65 to prevent forward and backward movement. Further, a nut 38 screwed in at a middle part of the spindle 3 to hold the bearing presses the bearing 66 against a stepped portion of the spindle 3 formed in the rear of the bearing 66, such that the forward and backward movement of the spindle 3 with respect to the head stock 6 is regulated via the bearing holder 65 and the bearing 66.

The head stock 6 freely moves forward and backward in the same direction as the axis line C under the guidance of the slide guide 2, and the spindle moving member 7 which moves the spindle 3 forward and backward together with the head stock 6 is provided under the head stock 6.

The spindle moving member 7 has a screw shaft 71 extending in the same direction as the axis line C, the motor 73 which rotates the screw shaft 71, and a nut 72 screwed in the screw shaft 71. The head stock 6 is coupled to the nut 72, and moved forward and backward in the same direction as the axis line C together with the nut 72 by the rotation of the screw shaft 71 caused by the driving of the motor 73.

In the automatic lathe having the configuration described above, the rod material is supplied from the rear end of the spindle 3 through the through-hole 3a. Then, the draw bar 35 is moved forward while the front end of the rod material is protruding from the guide bush 4 at a predetermined length, and the collet chuck 32 is closed to grip the rod material. Subsequently, the motor 8 and the motor 11 are synchronously driven to rotate the spindle 3 and the guide bush 4 at the same speed. Then, the motor 73 of the spindle moving member 7 is driven so that the rod material is fed by predetermined length together with the spindle 3 in the same direction (Z direction) as the axis line C, thus performing predetermined machining with the tool T.

Next, there will be described with reference to FIGS. 4 and 5 a switching procedure of removing the guide bush 4 from the automatic lathe having the configuration described above and switching to an automatic lathe which does not comprise the guide bush 4.

Figure 4A:
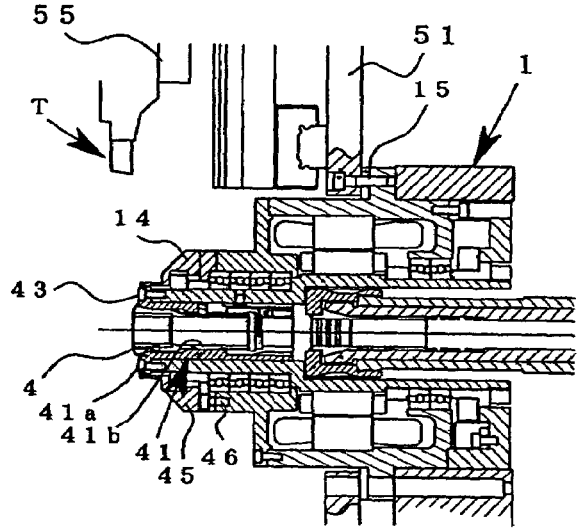
FIG. 4 is a diagram explaining a switching procedure of removing the guide bush from the automatic lathe in FIGS. 1 and 2 and switching to an automatic lathe which does not comprise a guide bush.

First, as shown in FIG. 4(a), the tool fitting member 55 is moved in the X direction to move the tool T away from the guide bush 4 to a position where the switching operation is not disturbed.

Figure 4B:
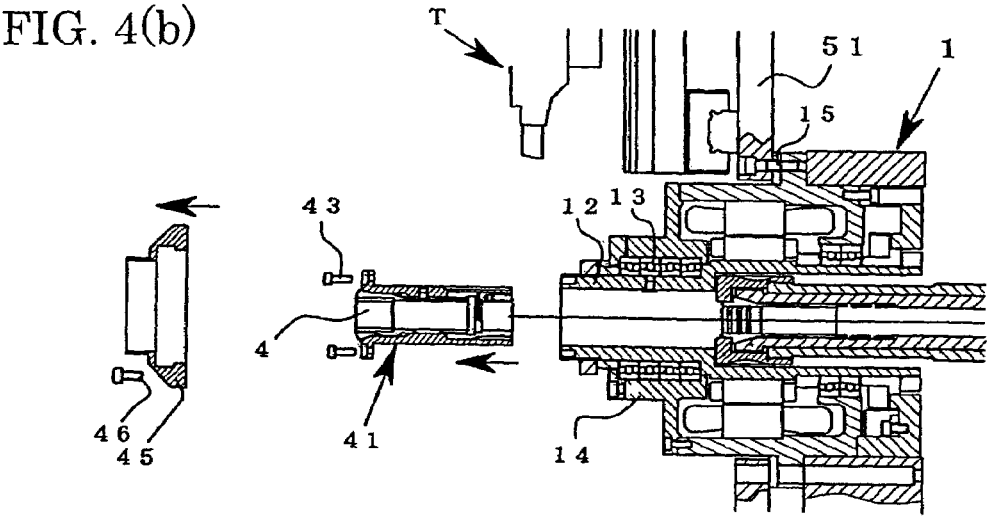

Then, as shown in FIG. 4(b), the bolt 46 is removed to remove the cover 45 from the bearing holder 14, and the bolt 43 is removed to remove the attachment 41 and the guide bush 4 from the guide sleeve 12.

Figure 4C:
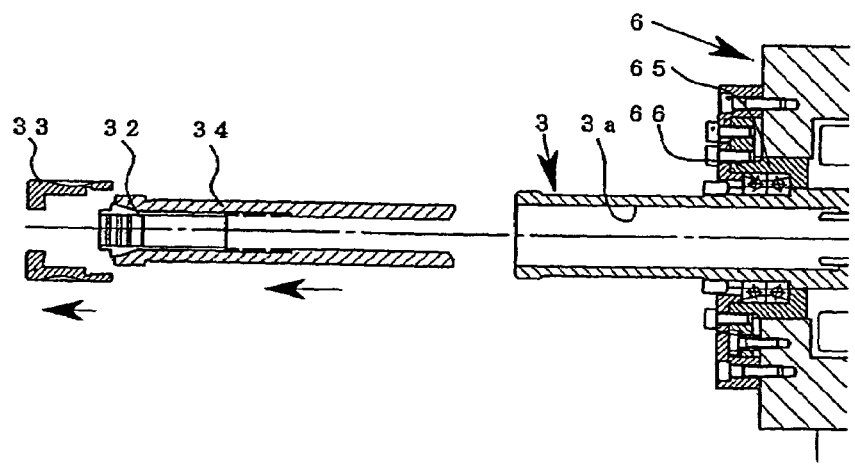

Furthermore, the motor 73 of the spindle moving member 7 is driven to move the spindle 3 backward together with the head stock 6, thus securing a sufficient space between the head stock 6 and the guide bush support table 1. Instead of driving the motor 73, the head stock 6 may be manually moved backward. When the head stock 6 is moved backward, the front end of the spindle 3 escapes from the guide sleeve 12 and is located between the head stock 6 and the guide bush support table 1. In this state, as shown in FIG. 4(c), the cap nut 33 is removed from the front end of the spindle 3, and the collet chuck 32 is pulled from the through-hole 3a of the spindle 3 together with the collet sleeve 34.

Figure 5A:
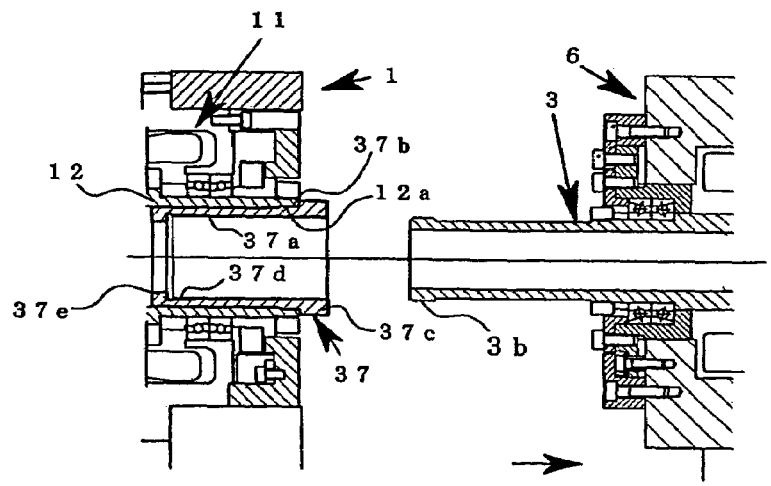
FIG. 5 is a diagram explaining a switching procedure continuing from the procedure in FIG. 4.

Next, a cylindrical spindle coupling nut 37 as shown in FIG. 5(a) is prepared, and inserted into and fitted to the rear end of the guide sleeve 12. The spindle coupling nut 37 comprises a nut main body part 37a having an outside diameter slightly smaller than the inside diameter of the guide sleeve 12 and having an inside diameter identical with the outside diameter of the spindle 3; a screw portion 37b which is formed on an outer peripheral surface of the rear end of the main body part 37a and which is to be screwed in a screw portion 12a formed on an inner peripheral surface of the rear end of the guide sleeve 12; a flange portion 37c formed at a peripheral edge of an opening at the rear end of the screw portion 37b; a screw portion 37d which is formed on an inner peripheral surface of the front end of the main body part 37a and into which the screw portion 3b at the front end of the spindle 3 is screwed; and an annular pendent portion 37e formed diametrically inward at a peripheral edge of an opening at the front end of the main body part 37a.

The spindle coupling nut 37 having the configuration described above is inserted into the rear end of the guide sleeve 12 so that the screw portion 37b is screwed in the screw portion 12a and fastened thereto until the flange portion 37c contacts the rear end of the guide sleeve 12, thereby fitting the spindle coupling nut 37 to the guide sleeve 12.

Figure 5B:
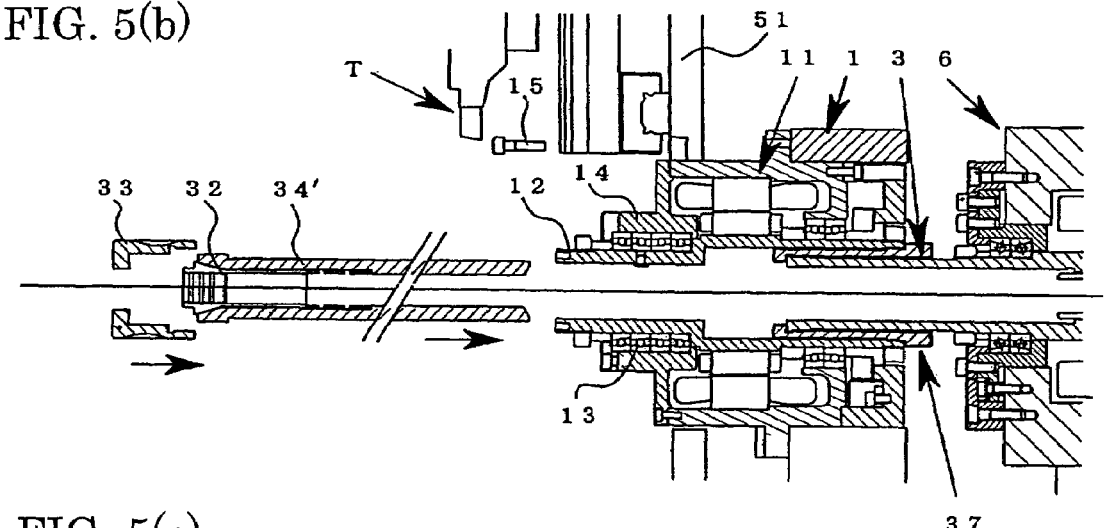

Next, as shown in FIG. 5(b), the plurality of bolts 15 coupling the guide bush support table 1 to the tool post base 51 is removed to cancel the fixing of the guide bush support table 1. This allows the guide bush support table 1 to freely move forward and backward on the slide guide 2, so that the front end of the spindle 3 is inserted into the spindle coupling nut 37 while the guide bush support table 1 is being manually moved toward the head stock 6. Moreover, while the spindle 3 is being moved, the screw portion 3b of the spindle 3 is screwed in the screw portion 37d of the spindle coupling nut 37, and fastened thereto until the front end of the spindle 3 contacts the flange portion 37e.

In this manner, the spindle 3 is coupled to the guide sleeve 12 via the spindle coupling nut 37, and the forward and backward movement of the spindle 3 with respect to the guide bush support table 1 is regulated. Moreover, the rotation can be transmitted between the guide sleeve 12 and the spindle 3 via the spindle coupling nut 37. In this embodiment, the spindle coupling nut 37 forms spindle fixing means for positioning and fixing the spindle 3 at a specified position on the guide bush support table 1.

Subsequently, as shown in FIG. 5(b), a collet sleeve 34' formed for the automatic lathe which does not comprise the guide bush 4 is prepared, and the collet chuck 32 is inserted into the front end of the collet sleeve 34' and then inserted into the through-hole 3a of the spindle 3 from the front end of the guide sleeve 12.

Figure 5C:
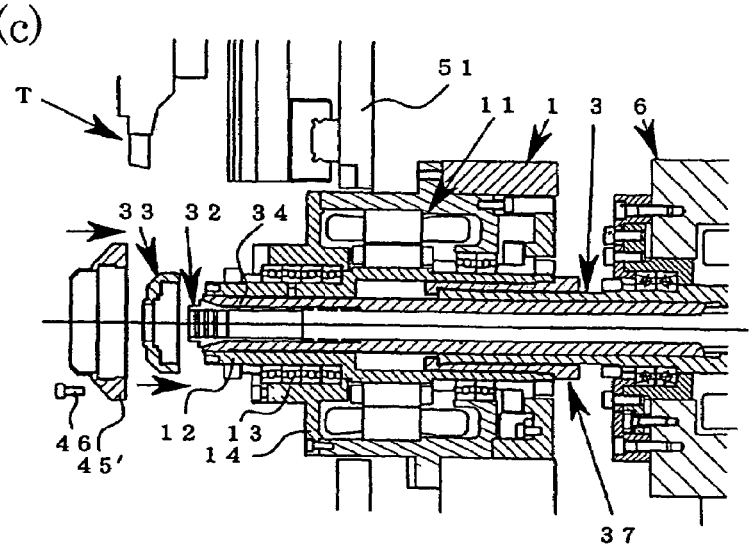

Furthermore, as shown in FIG. 5(c), a cap nut 33' formed for the automatic lathe which does not comprise the guide bush 4 is fitted in a screwed state to the screw portion of the guide sleeve 12, thereby regulating the collet sleeve 34' and the collet chuck 32 so that they do not escape from the front end of the spindle 3. At this point, since the rear end of the collet sleeve 34' is in contact with the tip of the draw bar 35, the collet chuck 32 can be opened/closed by the forward and backward movement of the draw bar 35. In this embodiment, the collet sleeve 34' forms a chuck positioning member which positions the collet chuck 32 when the collet chuck 32 grips the rod material.

Furthermore, a cover 45' formed for the automatic lathe which does not comprise the guide bush 4 is fitted to the front end of the bearing holder 14 by the bolts 46.

This completes the switching. Thus, a chuck mechanism to grip the rod material is assembled at the front end of the guide sleeve 12 fitted with the guide bush 4. In addition, when the rod material is machined, the guide sleeve 12 serves as the spindle.

Figure 6:
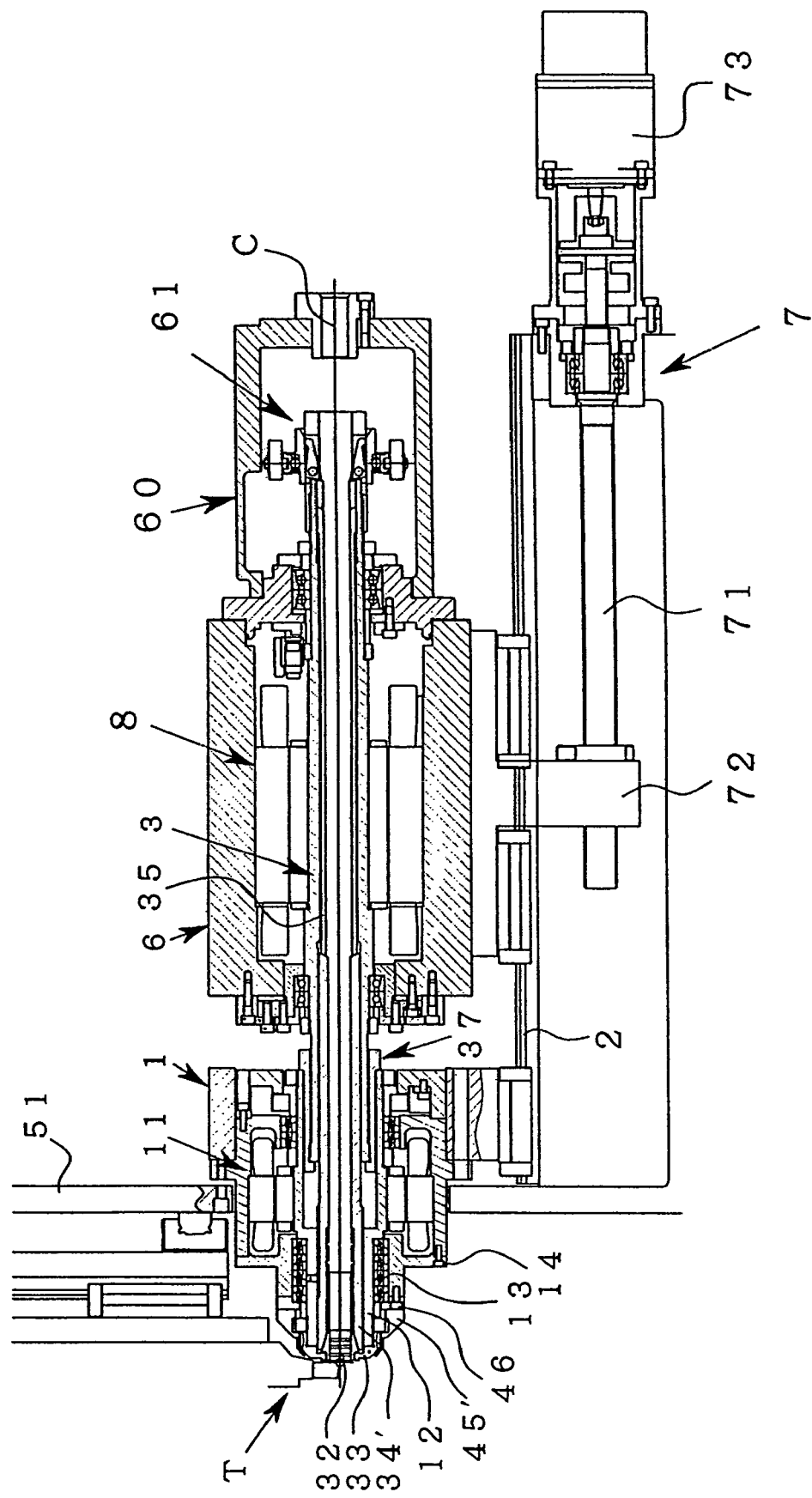
FIG. 6 is a sectional view showing the essential part including the head stock of the automatic lathe after the switching.

FIG. 6 is a sectional view showing the essential part of the automatic lathe after the switching has been performed by the procedure described above.

As shown in FIG. 6, the guide bush support table 1 after the switching is decoupled from the tool post base 51, and can move forward and backward in the same direction as the axis line C under the guidance of the slide guide 2. Moreover, since the guide bush support table 1 is coupled to the spindle 3 and the head stock 6 by the spindle coupling nut 37 via the guide sleeve 12, the guide bush support table 1, the head stock 6 and the spindle 3 integrally move forward and backward in the same direction as the axis line C owing to the spindle moving member 7 which moves the spindle 3 forward and backward. That is, after the switching, the guide bush support table 1 and the head stock 6 form a movable head stock.

Furthermore, the rod material is gripped by the collet chuck 32 in a state protruding from the front end of the spindle 3 at a predetermined length, and the spindle 3 is fed to the tool T together with the guide bush support table 1 and the head stock 6 in the Z direction (the same direction as the axis line C), thus machining the rod material.

As described above, since the guide sleeve 12 serves as the spindle when the rod material is machined, the high rigidity of the tip of the spindle is kept during the machining of the rod material, thereby allowing the rod material to be highly accurately machined.

Figure 7A:
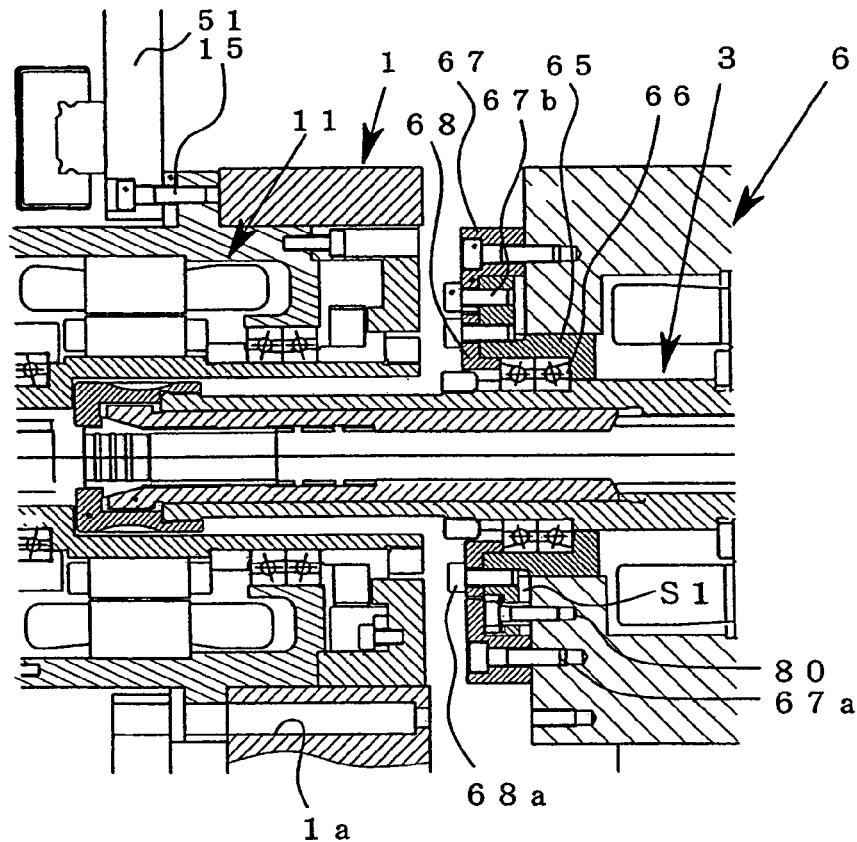
FIG. 7 includes FIG. 7(a) which is a sectional view wherein parts corresponding to the rear end of the guide bush support table and the front end of the head stock before the switching are enlarged, and FIG. 7(b) which is a sectional view wherein the essential part in FIG. 7(a) is further enlarged.
Figure 7B:
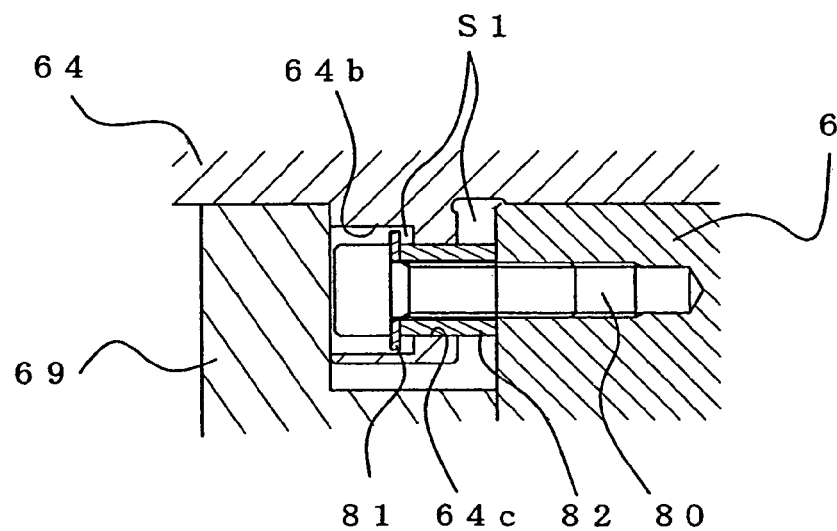
Figure 8:
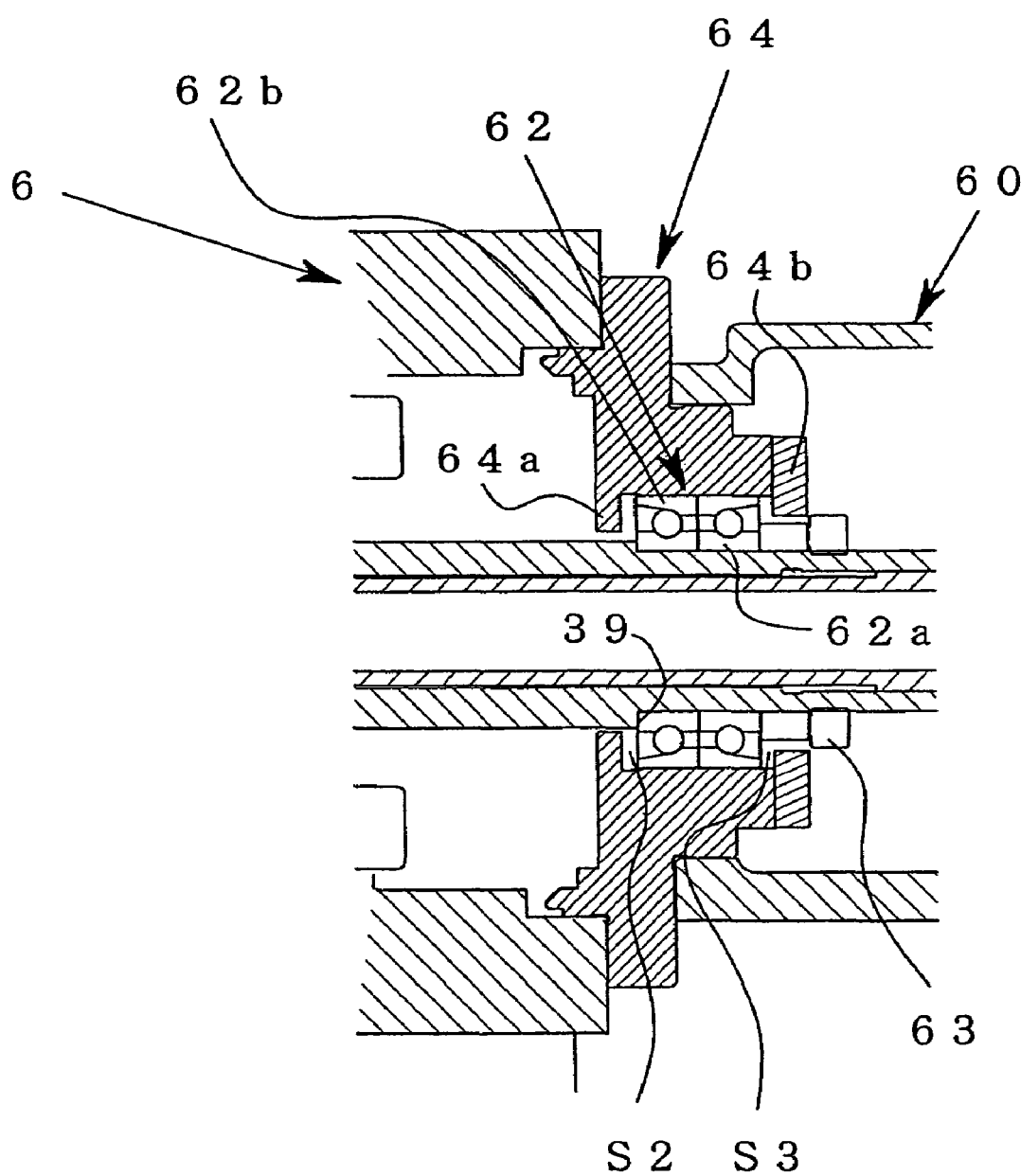
FIG. 8 is a sectional view in which a part corresponding to a bearing portion supporting the rear end of the spindle is enlarged.
Figure 9:
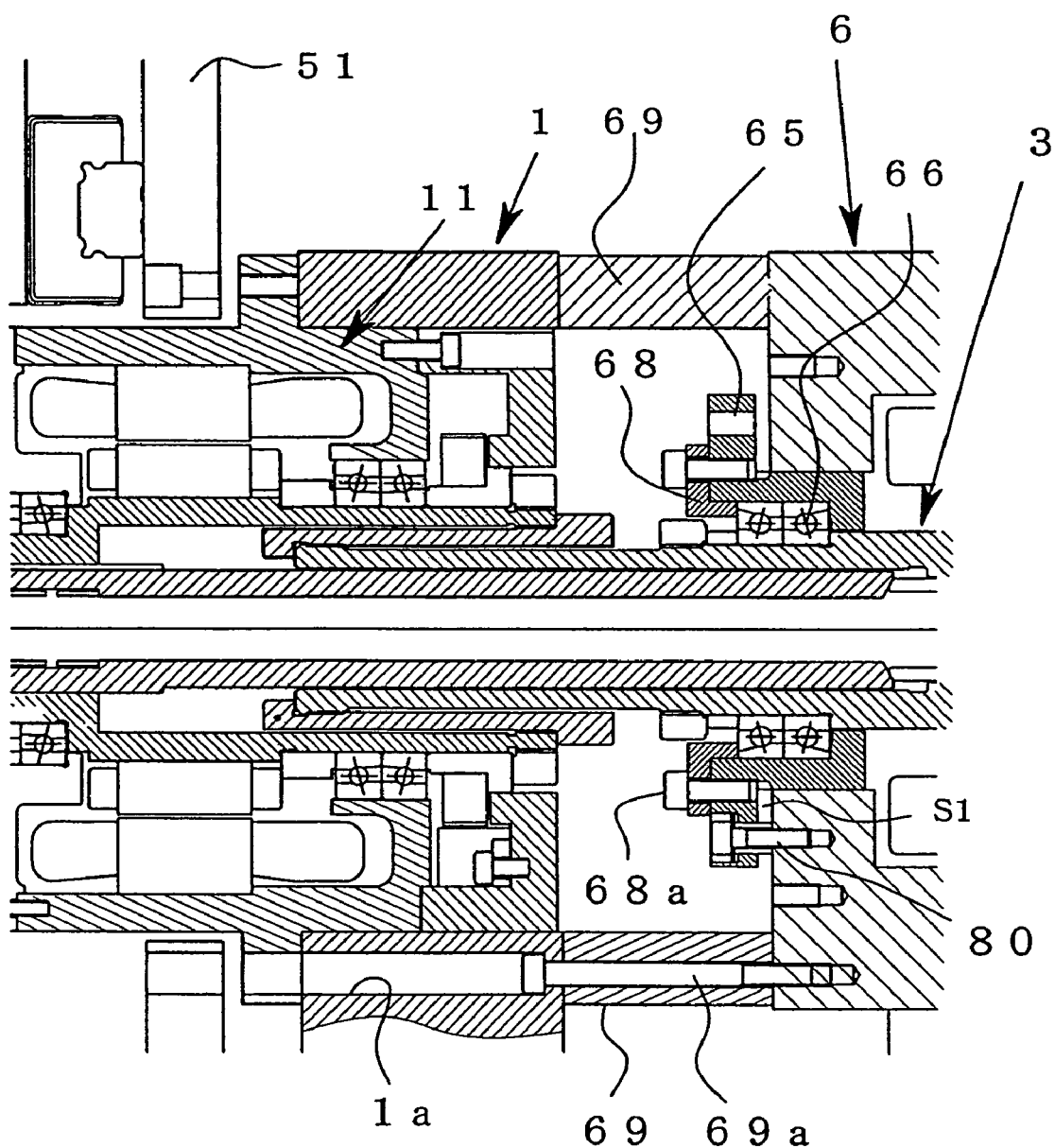
FIG. 9 is a sectional view in which a portion coupling the guide bush support table to the head stock after switching is enlarged.

FIGS. 7 to 9 concerns another embodiment of the present invention. FIG. 7(a) is a sectional view in which parts corresponding to the rear end of the guide bush support table and the front end of the head stock before the switching are enlarged. FIG. 7(b) is a sectional view in which the essential part in FIG. 7(a) is further enlarged. FIG. 8 is a sectional view in which a part corresponding to a bearing portion supporting the rear end of the spindle is enlarged. FIG. 9 is a sectional view in which a portion coupling the guide bush support table to the head stock after the switching is enlarged.

In the embodiment previously described, the head stock 6 is coupled to the guide bush support table 1 by the spindle coupling nut 37, but in this embodiment, another coupling means (coupling member 69) is used in addition to the spindle coupling nut 37 to couple the guide bush support table 1 to the head stock 6. Thus, in a case where the rod material is machined without using the guide bush 4, the use of another coupling means makes it possible to reduce the burden on the spindle 3 when the spindle 3 is moved together with the guide bush support table 1 and the head stock 6.

As shown in FIG. 7(a), the bearing holder 65 holding the bearing 66 is fitted to a front end surface of the head stock 6 by at least one bolt 80 so as not to drop from the head stock 6 and so as not to rotate with respect to the head stock 6.

As shown in FIG. 7(b), the bolt 80 is equipped with a washer 81 and a sleeve 82 in a fitted state. The bolt 80, the washer 81 and the sleeve 82 are inserted in a bolt hole 65b formed in the flange portion of the bearing holder 65, and screwed into a screw hole in the front end surface of the head stock 6 through a through-hole 65c formed at the bottom of the bolt hole 65b. Since the length of the sleeve 82 (the length in the axis line C direction) is formed larger than the thickness of the bottom of the bolt hole 65b, a small amount of space S1 is formed between the flange portion of the bearing holder 65 and the front end surface of the head stock 6 and between the washer 81 and the bottom of the bolt hole 65b when the bolt 80 is tightened.

It is to be noted that a stepped bolt in which a diameter in a shaft portion is larger than a diameter in a helical portion may be used instead of the washer 81 and the sleeve 82.

The dimensions of the space S1 should be larger than a maximum value of a thermal expansion amount of the spindle 3 at the front end of the head stock 6. In this embodiment, the space S1 forms a thermal expansion absorption member which absorbs a dimensional change due to the thermal expansion of the spindle 3. Further, in this embodiment, the bolt 80 and the sleeve 82 form a space between the bearing holder 65 and the head stock 6, and form a fitting member which prevents the bearing holder 65 from rotating with respect to the head stock.

Furthermore, as shown in FIG. 7(a), a halved or trisected bearing fixing member 67 is annually disposed around the bearing holder 65, and fitted to the front end surface of the head stock 6 by a bolt 67a in a state engaged with the bearing holder 65. Further, the bearing holder 65 is coupled to the bearing fixing member 67 by a plurality of bolts 67b. Thus, the bearing holder 65 is fixed to the head stock 6 via the bearing fixing member 67. Since the spindle 3 and the bearing holder 65 are regulated so as not move with respect to each other as previously described, the bearing holder 65 is fixed to the head stock 6 via the bearing fixing member 67 such that the forward and backward movement of the spindle 3 with respect to the head stock 6 is also regulated. That is, in this embodiment, the bearing holder 65 forms an engaging member of regulating means for engaging with the spindle 3 to regulate the forward and backward movement of the spindle 3 with respect to the head stock 6.

It is to be noted that in FIG. 7, a numeral 68 denotes a bearing holder which holds an outer ring of the bearing 66 from a front end side thereof, and it is fitted to the bearing holder 65 by a bolt 68a.

The bearing 62 supporting the rear end of the spindle 3 has, as shown in FIG. 8, an inner ring 62a thereof held from the front and rear thereof between the nut 63 described above and the step portion 39 of the spindle 3, and regulated so as not to move forward and backward with respect to the spindle 3. On the other hand, a protrusion 64a projecting inward in the diametrical direction is formed at the front end of the bearing holder 64, and a ring-shaped holding member 64b is fitted to the rear end of the bearing holder 64. Moreover, spaces S2 and S3 which absorb the thermal expansion of the spindle 3 are formed between the front end of an outer ring 62b and the protrusion 64a and between the rear end of the outer ring 62b and the holding member 64b. The bearing 62 is capable of moving forward and backward together with the spindle 3 with respect to the bearing holder 64 to the extent corresponding to the spaces S2 and S3. The dimensions of the spaces S2 and S3 should be greater than the thermal expansion amount of the spindle 3 due to the heating of the rotors 8a and 11a of the motors 8 and 11, in the same manner as the space S1 described above.

As shown in FIG. 9, after the guide bush 4 has been removed, the guide bush support table 1 is coupled to the head stock 6 by the coupling member 69. A procedure of coupling the guide bush support table 1 to the head stock 6 by the coupling means 69 is as follows.

Before the procedure of coupling the spindle 3 to the guide bush support table 1 by the spindle coupling nut 37 described in the previous embodiment, the head stock 6 is moved backward from the guide bush support table 1 to secure a sufficient space between the head stock 6 and the guide bush support table 1. Then, the bolts 67a and 67b are removed to remove, from the front end surface of the head stock 6, the bearing fixing member 67 fixing the bearing holder 65 to the head stock 6. Subsequently, a plurality of coupling members 69 is disposed on the circumference of the front end surface of the head stock 6 around the axis line C, and a bolt 69a is inserted into a bolt hole 1a penetrating from a front end surface to a rear end surface of the guide bush support table 1, and then the guide bush support table 1 and the coupling members 69 are inserted therethrough, thus screwing the bolt 69a into a screw hole formed in the front end surface of the head stock 6. Then, the bolt 69a is tightened, and the guide bush support table 1 is coupled to the head stock 6 by the coupling members 69 while the guide bush support table 1 and the head stock 6 are being moved in a direction to approach each other.

In this case, if the bearing fixing member 67 is removed from the head stock 6, the fixing of the bearing holder 65 to the head stock 3 in the axis line C direction is cancelled, but the spindle 3 is fitted to the guide bush support table 1 so as not to move forward and backward. Therefore, after the head stock 6 is coupled to the guide bush support table 1 by the coupling members 69, the spindle 3 and the bearing holder 65 do not freely move forward and backward with respect to the head stock 6 even if the bearing fixing member 67 is removed. If the spindle 3 expands due to the heat of the rotor 11a of the motor 11, the bearing holder 65 moves within the range of a space S due to the thermal expansion and absorbs the thermal expansion of the spindle 3.

This embodiment has an advantage that it is not at all necessary for an operator to remove or loosen the bolt 80 fitting the bearing holder 65 to the front end surface of the head stock 6 during the switching, and that the switching operation can be easily and rapidly performed by anyone who is not a skilled operator or a person in charge of a manufacturer that has manufactured and sold the automatic lathe. Moreover, the bearing holder 65 does not separate from the head stock 6 owing to the bolt 80, such that the displacement of the core of the spindle 3 due to the separation of the bearing holder 65 from the head stock 6 is avoided and the safety of the operator can be secured.

When the guide bush 4 is removed from the front end of the guide sleeve 12 to switch to the automatic lathe which does not comprise the guide bush 4, the bolt 67a fitting the fitting member 67 to the head stock 6 and the bolts 67b coupling the fitting member 67 to the bearing holder 65 are removed, and the fitting member 67 is removed from the front end surface of the head stock 6. Subsequently, as described in the previous embodiment, the coupling members 69 are used to couple the guide bush support table 1 to the head stock 6. Further, the rear end of the guide bush support table 1 is coupled to the front end of the head stock 6 by the plurality of coupling members 69.

Since the guide bush support table 1 is firmly coupled to the head stock 6 by the coupling members 69, the space therebetween does not change even if the spindle 3 thermally expands in the axis line C direction due to the heat of the rotors 8a and 11a of the motors 8 and 11 during the machining of the rod material. The dimensional change of the spindle 3 due to the thermal expansion is absorbed by the space S1 between the bearing holder 65 and the front end surface of the head stock 6 and the spaces S2 and S3 between the bearing 66 and the bearing holder 65. That is, in this embodiment, these spaces S1, S2 and S3 form the thermal expansion absorption members which absorb the dimensional change of the spindle 3 due to the thermal expansion.

While the preferred embodiments of the present invention have been described, the present invention is not at all limited by the embodiments described above.

For example, the spindle-moving-type automatic lathe has been described above by way of example wherein the head stock 6 moves together with the guide bush support table 1 after the switching, but when there is provided a tool post movable in the Z direction, the present invention can also be applied to a spindle-fixed-type automatic lathe wherein the head stock 6 and the guide bush support table 1 are fixed onto the bed. In this case, when the switching is performed, a driving system of the spindle moving member 7 should be separated from the control system of the automatic lathe without removing the bolts 15 coupling the guide bush support table 1 to the tool post base 51.

Furthermore, a spacer with a predetermined width is placed between the tool post base 51 and the front end surface of the guide bush support table 1, and this spacer is removed from the guide bush support table 1, for example, when the guide bush 4 is fitted, thereby allowing adjustment of the position of the guide bush 4 of the front end of the spindle 3 before and after the switching.

Still further, in the above description, the collet sleeve 34' formed for the automatic lathe which does not comprise the guide bush 4 and the collet chuck 32 are inserted from the front end of the guide sleeve 12 after the coupling of the head stock 6 to the guide bush support table 1 and then attached to the spindle 3 (see FIG. 5(b)). However, the collet sleeve 34' and the collet chuck 32 may be inserted from the front end of the spindle 3 immediately after the step shown in FIG. 4(c).

INDUSTRIAL APPLICABILITY

The present invention can be applied to a spindle-moving-type automatic lathe and a spindle-fixed-type automatic lathe, and can also be applied to a numerically controlled automatic lathe which performs, in accordance with a program, feeding and stopping of a rod material, determining and positioning of a tool, machining of the rod material with the tool, and parting of a machined product.

Furthermore, the present invention is not limited to an automatic lathe of a type which supplies a long rod material from a rod material supply device disposed in the rear of the automatic lathe, but the present invention can also be applied to an automatic lathe of a type which supplies a relatively short rod-like material to a collet at the front end of a spindle by use of, for example, a robot hand.

Still further, the present invention is not limited to a built-in type automatic lathe incorporating a motor in a guide bush support table, but the present invention can also be applied to an automatic lathe of a type in which a motor is provided outside a guide bush support table and the driving force of this motor is transmitted to a spindle by a driving force transmission mechanism such as a belt or pulley.

The invention claimed is:

1. An automatic lathe which has a tool post and a spindle configured to relatively move in a spindle axis line direction and which machines a material gripped by a spindle chuck at the tip of the spindle by use of a tool installed on the tool post, the automatic lathe characterized by comprising:
   a head stock configured to move forward and backward;
   the spindle rotatably supported on the head stock and having a through-hole formed for the rod-like material to be inserted therethrough;
   spindle driving means which is provided in the head stock to rotate the spindle;
   the tool post equipped with a tool to machine the material gripped by the spindle chuck;
   a guide bush support table disposed closer to a tip side of the spindle than the head stock;
   support table fixing means for positioning and fixing the guide bush support table at a specified position of a bed;
   a guide member which is rotatably supported on the guide bush support table and which is regulated so as not to move forward and backward with respect to the guide bush support table and in which a through-hole is formed to insert the spindle therein;
   a guide bush detachably fitted to the tip of the guide member;
   guide bush driving means which is provided in the guide bush support table to rotate the guide member together with the guide bush;
   spindle moving means for moving the spindle forward and backward together with the head stock inside the guide member;
   spindle fixing means for preventing the spindle from moving forward and backward with respect to the guide bush support table, and positioning and fixing the spindle at a specified position on the guide bush support table when the guide bush is removed from the guide member; and control means for performing synchronous control of the spindle driving means and the guide bush driving means when machining the material by use of at least the guide bush.

2. The automatic lathe according to claim 1, characterized in that a guide is provided to guide the forward and backward movement of the guide bush support table so that the guide bush support table is movable along the guide when the fixing of the guide bush support table by the support table fixing means is cancelled, and that when the guide bush is removed to machine the material without using the guide bush, the material gripped by the spindle chuck is machined while the head stock and the guide bush support table are being integrally moved forward and backward.

3. The automatic lathe according to claim 1, characterized in that the support table fixing means has a positioning member positioned and fixed on the bed, and a bolt coupling the positioning member to the guide bush support table.

4. The automatic lathe according to claim 3, characterized in that a spacer with a specified width is placed between the positioning member and the guide bush support table so that the position of the guide bush or the tip of the spindle is adjustable when the guide bush is fitted or removed.

5. The automatic lathe according to claim 3, characterized in that the positioning member is a tool post base which supports the tool post.

6. The automatic lathe according to claim 1, characterized in that rotation transmission means for transmitting the rotation of the guide member to the spindle when the guide bush is removed is provided between the guide member and the spindle, so that the rotation of the guide member is transmitted to the spindle.

7. The automatic lathe according to claim 6, characterized in that the control means controls the driving of both the spindle driving means and the guide bush driving means in accordance with a cutting condition in order to use the spindle driving means and the guide bush driving means to drive the spindle when the material is machined without using the guide bush.

8. The automatic lathe according to claim 1, characterized in that when the guide bush is removed, the spindle chuck and a cam member which opens/closes the spindle chuck are removed from the spindle and located inside the tip of the guide member, and a chuck positioning member is fitted to the tip of the guide member to position the spindle chuck when the spindle chuck grips the material, thereby incorporating, in the tip of the guide member, a mechanism similar to a chuck mechanism of the spindle which grips the material during machining.

9. The automatic lathe according to claim 1, characterized in that when the guide bush is removed from the guide member, the head stock is coupled to the guide bush support table by coupling means.

10. The automatic lathe according to claim 9, characterized in that a thermal expansion absorption member which absorbs a dimensional change of the spindle due to thermal expansion is provided in at least one place of the spindle.

11. The automatic lathe according to claim 10, characterized in that the thermal expansion absorption member has regulating means for regulating the spindle so that the spindle does not to move forward and backward with respect to the head stock when the guide bush is fitted, and regulation canceling means for canceling the regulation of the spindle by the regulating means.

12. The automatic lathe according to claim 11, characterized in that the regulating means comprises an engaging member which engages with the spindle in the front and rear on the spindle axis line, and a fitting member which fits the engaging member to the head stock so that the engaging member does not rotate with respect to the head stock and so that the engaging member has a gap of preset dimensions in the spindle axis line direction without separating from the head stock when the regulation of the spindle is cancelled by the regulation canceling means; and the regulation canceling means is a fitting member which fits and fixes the engaging member onto the head stock.

* * * * *